United States Patent
Avitsur et al.

(10) Patent No.: US 6,628,756 B2
(45) Date of Patent: Sep. 30, 2003

(54) SYSTEM AND METHOD FOR TELEPHONE NUMBER VERIFICATION AND IDENTIFICATION

(76) Inventors: Yair Avitsur, 12 Hamalot Street, Ranana (IL); Yosef Yahav, 24 Katsnelson, Kfar-Saba (IL); Alon Mano, Kinneret 16, Kfar-Saba (IL)

( * ) Notice: Subject to any disclaimer, the term of this patent is extended or adjusted under 35 U.S.C. 154(b) by 17 days.

(21) Appl. No.: 09/802,901

(22) Filed: Mar. 12, 2001

(65) Prior Publication Data

US 2001/0009576 A1 Jul. 26, 2001

Related U.S. Application Data (63) Continuation-in-part of application No. 09/200,720, filed on Nov. 27, 1998, now Pat. No. 6,201,854.

(51) Int. Cl.[7] .......................... H04M 1/24; H04M 3/08; H04M 3/22
(52) U.S. Cl. ................... 379/27.01; 379/21; 379/29.06; 379/32.01; 379/32.05
(58) Field of Search .................. 379/1.01, 22.01–22.02, 379/27.01–27.03, 29.06, 30, 32.01–32.05, 21; 455/67.1, 67.4, 115, 226.1, 566–567

(56) References Cited

U.S. PATENT DOCUMENTS 5,883,943 A * 3/1999 Siddiqui
6,442,263 B1 * 8/2002 Beaton et al.

* cited by examiner

Primary Examiner—Duc Nguyen
(74) Attorney, Agent, or Firm—Mark M. Friedman (57) ABSTRACT

A testing environment and a method for telephone number identification and/or verification. The method identifies a telephone number associated with a tested telephone line by: (a) operatively connecting a test equipment to the tested telephone line; (b) dialing via a communication port of the test equipment, via the tested telephone line, via a cellular communication system, to a cellular receiver, and (c) processing a received signal received by the cellular receiver to identify the telephone number associated with the tested telephone line.

14 Claims, 4 Drawing Sheets

Figure 1

Testing Environment

(PRIOR ART)

SYSTEM AND METHOD FOR TELEPHONE NUMBER VERIFICATION AND IDENTIFICATION

This is a continuation-in-part of U.S. patent application Ser. No. 09/200,720 filed Nov. 27, 1998, now U.S. Pat. No. 6,201,854.

FIELD AND BACKGROUND OF THE INVENTION

The present invention relates to a testing system and a method for telephone number verification/identification in a local telephony network, also known as local access network, and in particular, to a testing system and method which is substantially automatic and yet which is also flexible and reliable, which permits verification and/or identification of telephone numbers while updating database information or while maintaining the database for local telephony network and, which enables verification and/or identification of telephone line numbers by utilizing cellular capabilities.

Manual or automatic telephone number verification and/or identification is a well known process. Currently available equipment relies upon the caller identification process. This process is a service according to which a telephone central office switch sends information signals about the incoming telephone call to the party being called. These information signals include the telephone number of the party originating the telephone call. The caller identification testing and transmitting signal or signals is provided by most, but not all, telephone central office switches. Telephone products with caller identification require special hardware, firmware and software to adapt the products to the relevant physical and data-link layers. ISDN lines and interfaces are equipped with this capability, for example.

In order to perform the verification and/or identification for updating or maintaining the database, for example, special test equipment must be connected parallel to the tested telephone line, which is usually a "live" or fully connected and functioning, telephone line. Telephone number verification/identification by using the caller identification signal usually involves initiating a telephone call from the tested line, if possible, to a known and dedicated telephone and telephone line. The special test equipment then intercepts the data signals from the dedicated equipment, including the telephone number of the tested line.

Unfortunately, this method has a number of limitations. For example, the testing equipment cannot initiate a telephone call from the tested telephone line if the tested line is busy. Similarly, the testing process cannot be performed if the user connected to the tested line is dialing the telephone or otherwise interfering with the process. For telephone lines that only permit incoming telephone calls, no telephone call can be initiated in order to perform the test. The special test equipment cannot initiate a telephone call while being connected to lines which are non-direct lines (ISDN and PCM lines, for example). In addition, some telephone central office switches do not have the caller identification signal/signals that enables the process to be performed.

There are additional circumstances in which the above-mentioned method is limited or non-applicable. For example, a line may have a blocked Caller Identification (CID) unit for a number of reasons (e.g., the telephone line owner does not want to have an identifiable line). A line may be designated as a withheld line, in which case the line can be used to receive calls, but cannot be used to dial to the central office switch.

Even when the caller identification process can be performed for testing of the telephone line, this process has the drawback of requiring at least two to eight seconds to perform, which is the combination of the time required to dial the telephone number on the tested line and to receive the caller identification information at the party receiving the telephone call.

A preferable and/or complementary method and testing system for automatic telephone verification and/or identification would use standard features of any digital or telecommunications switch, and would not have the drawbacks of the known caller identification process. Unfortunately, such a testing system and method are not currently available.

An additional drawback of the prior art is that it needs a Caller Identification (CID) unit, linked to the telephone central office switch, to process the identification, along with an additional telephone line dedicated for the testing procedure.

Therefore, there is an unmet need for, and it would be highly useful to have, a testing system and a method for performing telephone verification and/or identification with standard features of any digital telecommunications switch, which does not have the limitations of the currently known process, and which is reliable and efficient. It would be of further advantage to have such a testing system and a method that obviate the need for a CID unit and for a telephone line dedicated for telephone line testing.

SUMMARY OF THE INVENTION

The present invention is of a testing environment and a method for telephone number identification and/or verification. The testing environment and method of the present invention analyzes incoming signals of a telephone call being made to the tested line as the receiving party from the central office switch. These incoming signals preferably include ring signal, waiting call tone and/or CID message, and voice signals. The incoming signals are analyzed and processed by the testing unit according to the present invention in order to identify and/or verify the telephone number. Thus, the testing environment and method of the present invention has the advantage of being able to automatically analyze signals received from the tested line as the receiving party, rather than requiring the tested telephone line to initiate the telephone call for testing purposes.

According to the present invention, there is provided a method for identifying and/or verifying a telephone number associated with a tested telephone line, the method including the steps of: (a) connecting to the tested telephone line; (b) dialing the given telephone number associated with the tested telephone line; (c) analyzing a received signals received from the tested telephone line; and (d) if the received signals include a ringing type signal, verifying the telephone number.

According to another embodiment of the present invention, there is provided a testing environment for identifying and verifying a telephone number associated with a tested telephone line, the testing environment including: (a) a central office switch for transmitting signals to the tested telephone line; (b) a tap for connecting to the tested telephone line for receiving signals from the tested telephone line; (c) a sensing unit for sensing the signals to obtain sensed signals; (d) a processing unit for analyzing and converting the sensed signals to data signals; and (e) a MMI and processing unit for determining if the data signals feature a ringing type signal, such that if the data signals feature the ringing type signal, the telephone number is verified.

According to another aspect of the present invention, there is provided a method for identifying a telephone number associated with a tested telephone line, the method including the steps of: (a) operatively connecting a test equipment to the tested telephone line; (b) dialing via a communication port of the test equipment, via the tested telephone line, via a cellular communication system, to a cellular receiver, and (c) processing a received signal received by the cellular receiver to identify the telephone number associated with the tested telephone line.

According to further features in the described preferred embodiments, the method further includes: (d) displaying the telephone number associated with the tested telephone line on a digital readout of the test equipment.

According to still further features in the described preferred embodiments, the method further includes: (d) storing the telephone number associated with the tested telephone line in a memory storage area.

According to still further features in the described preferred embodiments, the method further includes: (d) if the telephone number is not identified, obtaining other data signals from the processing of the signal, the data signals being associated with the tested telephone line.

According to another aspect of the present invention, there is provided a method of identifying a telephone number associated with a tested telephone line, the method including the steps of: (a) operatively connecting a test equipment to the tested telephone line; (b) dialing via a communication port of the test equipment, via the tested telephone line, via a cellular communication system, to a cellular receiver within the test equipment, and (c) processing a received signal received from the dialing to identify the telephone number associated with the tested telephone line.

According to another aspect of the present invention, there is provided a method of verifying a telephone number associated with a tested telephone line, the method including the steps of: (a) providing a test equipment having: a monitoring unit for monitoring signals on the tested telephone line to obtain monitored signals; a processing unit for processing the monitored signals; an MMI unit, and means for communicating to a cellular network; (b) operatively connecting the test equipment to the tested telephone line; (c) dialing from the test equipment via the tested telephone line, such that at least one signal is transmitted via the cellular network, via a central office switch, to the tested telephone line, and (d) processing a received signal received from the tested telephone line, the received signal being associated with the at least one signal.

According to further features in the described preferred embodiments, the method further includes: (e) if the received signal is a ringing type signal, verifying the telephone number.

According to further features in the described preferred embodiments, the method further includes: (e) if the received signal is not a ringing type signal: (i) dialing from the test equipment, via the tested telephone line, via the cellular network, to a cellular receiver, and (ii) processing a received signal received from the dialing of step (i) to identify the telephone number associated with the tested telephone line.

According to further features in the described preferred embodiments, the ringing type signal is a ringing signature, the signature selected from the group consisting of a change in an impedance of the tested telephone line, a change in a current of the tested telephone line, a change in a voltage of the tested telephone line, a change in frequency spectrum of the tested telephone line, and a change in energy of the received signal of the tested telephone line.

According to yet another aspect of the present invention, there is provided a method of testing a communication performance of a local communication channel with a cellular network, the method including the steps of: (a) providing a system including: (i) a test equipment having communication means to the cellular network; (ii) an address for communicating data signals; and (iii) at least one processor operatively connected to the test equipment; (b) communicating, via the cellular network, a data message including a group of pre-selected data signals, between a particular location and the address; and (c) comparing a received data message with the pre-selected data signals.

According to further features in the described preferred embodiments, the method further includes: (d) evaluating the local communication quality by examining at least one communication performance parameter.

According to further features in the described preferred embodiments, the performance parameter is selected from the group consisting of: bit error rate, noise level, delays, click frequency, cut-off frequency, pitch distortion, echo distortion, a bandwidth parameter, and an attenuation parameter.

According to further features in the described preferred embodiments, the communicating includes transmitting from the test equipment to the address.

According to further features in the described preferred embodiments, the communicating includes transmitting from the address to the test equipment.

According to further features in the described preferred embodiments, the method further includes: (e) retransmitting data received by the address to the test equipment disposed at the location, prior to step (c).

According to yet another aspect of the present invention, there is provided a system for identifying a telephone number associated with a tested telephone line including: (a) a test equipment having: (i) means for connecting to the tested telephone line; (ii) a dialing unit; (iii) a receiver for receiving a signal transmitted via the tested telephone line and via a cellular channel; and (b) a processor for processing the signal to identify the telephone number and additional data signals associated with the tested telephone line.

According to further features in the described preferred embodiments, the test equipment further includes: (iv) a digital readout for displaying the data signals associated with the tested telephone line.

According to further features in the described preferred embodiments, the test equipment further includes: (iv) a memory storage area for storing the data signals associated with the tested telephone line.

According to yet another aspect of the present invention, there is provided a system for verifying a telephone number associated with a tested telephone line, the system including: a test equipment including: (i) means for connecting to the tested telephone line; (ii) means for transmitting a signal via a cellular network, to the tested telephone line; (iii) a monitoring unit for monitoring signals on the tested telephone line to obtain monitored signals; and (iv) a processing unit designed and configured to process the monitored signals, such that the tested telephone number is verified.

According to further features in the described preferred embodiments, the system further includes: (b) an NMI unit operatively connected to the test equipment.

According to further features in the described preferred embodiments, the system further includes: (b) a memory storage unit for storing connected to the test equipment.

According to further features in the described preferred embodiments, the monitored signals include a ringing type signal.

According to further features in the described preferred embodiments, the ringing type signal has a ringing signature, the signature selected from the group consisting of a change in an impedance of the tested telephone line, a change in a current of the tested telephone line, a change in a voltage of the tested telephone line, a change in frequency spectrum of the tested telephone line, and a change in energy of the received signal of the tested telephone line.

According to yet another aspect of the present invention, there is provided a system for testing a communication performance of a local communication channel with a cellular network, the system including: (a) a test equipment having: (i) communication means to the cellular network; (b) an address for communicating data signals with the test equipment, the address having communication means to the cellular network and (c) a processor operatively connected to the test equipment, the processor designed and configured for evaluation of the communication performance by examining at least one communication performance parameter.

According to further features in the described preferred embodiments, the at least one communication performance parameter is selected from at least one of the group consisting of bit error rate, noise level, delay, click frequency, cut-off frequency, pitch distortion, echo distortion, a bandwidth parameter, and an attenuation parameter.

According to further features in the described preferred embodiments, the address for communicating data signals is operatively connected to a second processor.

According to further features in the described preferred embodiments, the address for communicating data signals is operatively connected to a server.

According to further features in the described preferred embodiments, the processor is an integral part of the test equipment.

According to further features in the described preferred embodiments, the address is an integral part of the test equipment.

According to further features in the described preferred embodiments, the communication means of the test equipment includes transmitting means and receiving means, the test equipment being designed and configured to transmit a data message to the address and to receive the data message from the address.

According to further features in the described preferred embodiments, the processor is an integral part of the test equipment.

Hereinafter, the term "man-machine interface and processing unit" refers to a particular computer hardware system or to a particular software operating system. Examples of such hardware systems include, but are not limited to, personal computers (PC), palm computers, handheld terminals and portable computers, Macintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™"), Windows CE™, Windows95™, and Windows98™, as well as any suitable operating system for embedded units or palm/handheld type portable computers.

For the present invention, a software application could be written in substantially any suitable programming language, which could easily be selected by one of ordinary skill in the art. The programming language chosen should be compatible with the man-machine interface and processing unit according to which the software application is executed. Examples of suitable programming languages include, but are not limited to, C, C++, Visual Basic and Java.

In addition, the present invention could be implemented as software, firmware or hardware, or as a combination thereof. For any of these implementations, the functional steps performed by the method could be described as a plurality of instructions performed by a data processor.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a testing environment and a method for telephone number identification and/or verification. The testing environment and method of the present invention analyzes incoming signals of a telephone call being made to the tested line as the receiving party from the central office switch. These incoming signals preferably include, but are not limited to, ring signal, ringing signature, waiting call tone and voice signals, or any other incoming signal being received from the central switch. The incoming signals are analyzed and processed by the testing unit according to the present invention in order to identify and/or verify the telephone number. Thus, the testing environment and method of the present invention has the advantage of being able to analyze data signals obtained from signals received from the tested telephone line as the receiving party, rather than requiring the tested telephone line to initiate the telephone call for testing purposes.

Another aspect of the present invention enables the verification and/or identification of telephone numbers without requiring an additional line, dedicated for the testing, by utilizing test equipment with cellular capabilities, which also enables to test cellular channel performance in various regions.

The principles and operation of the testing environment and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

As used herein and in the claims section that follows, the term "telephone" refers to telecommunication means (also known as telecom means) such as telephone, telex, fax, computer, cellular telephone, data terminal, and the like; the term "telephone company" refers to a provider of telecommunication services; and the term "telephone number" refers to a telecommunication line dialing number.

As used herein in the specification and claims that follows, the term "multi-channel test equipment" refers to a test equipment having multiple cellular units that enable simultaneous cellular transmitting and receiving.

Figure 1:
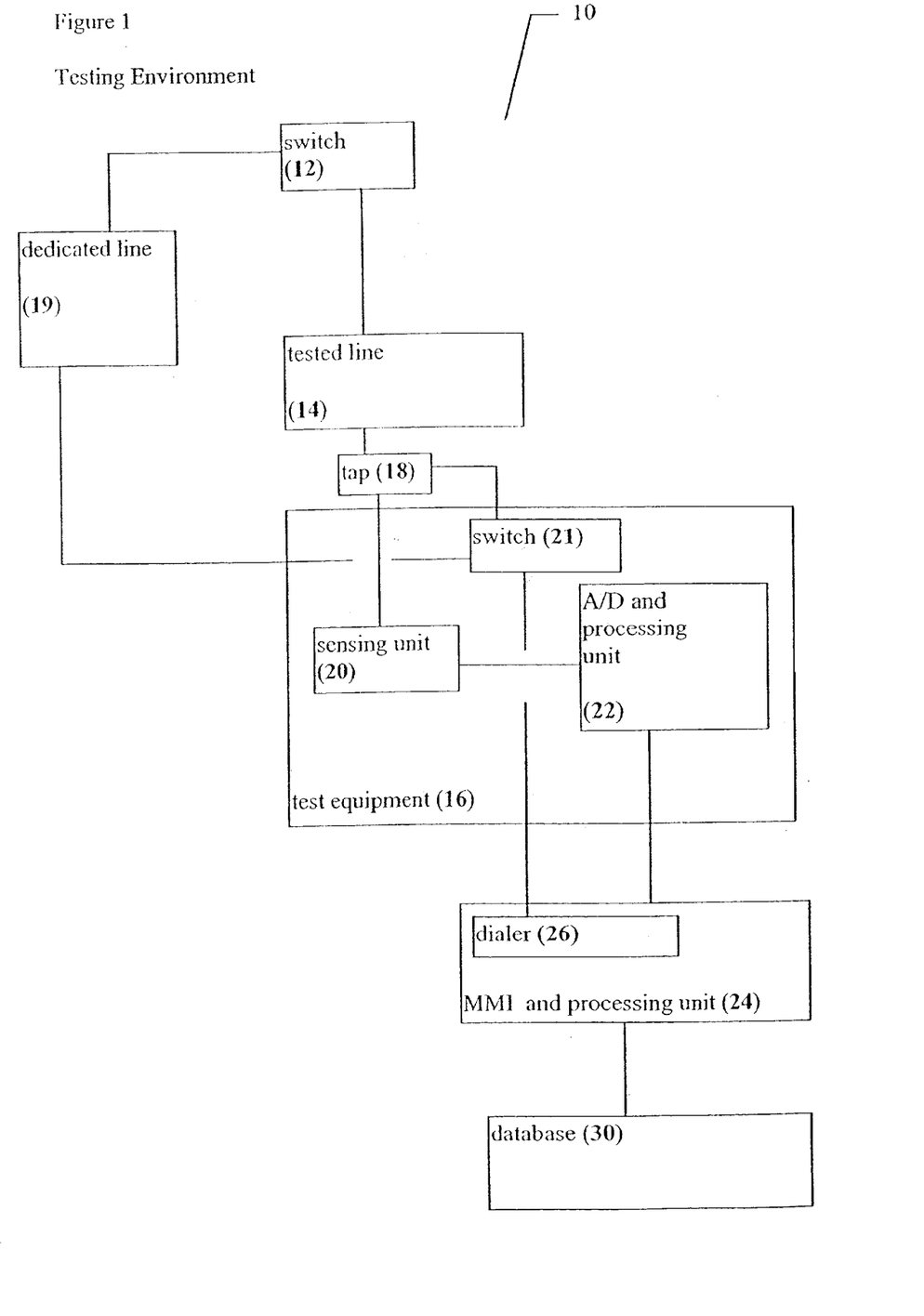
FIG. 1 is a schematic block diagram illustrating an exemplary testing environment according to the present invention.

Referring now to the drawings, FIG. 1 is a schematic block diagram illustrating an exemplary testing environment according to the present invention. A testing environment 10 includes a number of different components which are involved in the testing process, such as a telephone company central switch 12 which is connected to a tested telephone line 14 on which the method of the present invention is performed to identify and/or verify the telephone number assigned to tested telephone line 14. A test equipment 16 is also connected to tested telephone line 14, for the purposes of identifying and/or verifying the telephone number. Test equipment 16 performs the method of the present invention on tested telephone line 14. Test equipment 16 optionally is implemented as hardware, firmware, or a combination of either type of component with software.

According to one embodiment, telephone company central switch 12 initiates the telephone call to tested telephone line 14. Preferably, however, test equipment 16 is able to initiate the telephone call to tested telephone line 14 from a second auxiliary dedicated telephone line 19 as shown. As described in further detail below, preferably a telephone call can also be initiated from tested telephone line 14, for example in order to receive information on the same tested telephone line 14 from central switch 12.

One preferred implementation of test equipment 16 features a tap 18 connected to tested telephone line 14 for receiving signals about the incoming telephone call. Tap 18 is optionally a one-pair tap, but is preferably a five-pair or ten-pair "tap". Each telephone line can be described as a pair since it has a beginning point and an end point. Five-pair or ten-pair taps are preferable since at the cross-connection box, the lines are in blocks of 100 lines, 10 lines in each group. However, the lines are connected in blocks of 50 lines to central switch 12, 5 lines in each group. Therefore, if the method of the present invention is to be performed on such a cross-connection box, the larger number of pairs in the tap is preferable.

Tap 18 taps the signals passing through tested telephone line 14 and passes the signals to sensing unit 20. Sensing unit 20 is hardware, which receives the signal. When the signals are analog signals they are converted to digital data by an A/D conversion (or other suitable means) and processing unit 22. Preferably, A/D conversion and processing unit 22 also performs preprocessing of the digital data, for example in order to obtain more reliable data.

The converted digital data is then passed to a MMI and processing unit 24 for further analysis. MMI and processing unit 24 is able to analyze the digital data and to perform the method of the present invention with one or more software modules, as described in greater detail below with regard to FIG. 2. Sensing unit 20 and A/D conversion and processing unit 22 are preferably incorporated into a single physical unit, even though both sensing unit 20 and A/D conversion and processing unit 22 are functionally distinct components of test equipment 16. Furthermore, optionally and preferably, MMI and processing unit 24 is also incorporated as a single physical unit with test equipment 16.

MMI and processing unit 24 is preferably a palm computer or handheld portable computer which features a display device for displaying data to a user and which features an input device for entering data and/or instructions. The display device could be a monitor or a LCD display for example. Such an input device could be a mouse or other pointing device, and/or a keyboard or other external data entry device. The input device could also be a touch-sensitive screen, for example. MMI and processing unit 24 includes all necessary components for performing computations such as a CPU, memory, I/O interfaces such as a modem and optionally a permanent, writable storage medium such as a magnetic disk.

Optionally and more preferably, MMI and processing unit 24 includes a dialer 26 for initiating a telephone call from tested telephone line 14 to central switch 12 in order to receive such information as a voice announcement or a caller identification message. More preferably, dialer 26 is connected to a switch 21 within test equipment 16. Switch 21 is connected to both tested telephone line 14 through tap 18 and to dedicated auxiliary telephone line 19. Most preferably, dialer 26 initiates a telephone call to a dedicated telephone number at central switch 12 in order to determine the telephone number associated with tested telephone line 14, for example when the telephone number previously associated with tested telephone line 14 is shown to be different (see FIG. 2 below for more details).

In addition, MMI and processing unit 24 preferably has access to a telephone number database 30, which contains information about the telephone numbers of the telephone lines. As noted previously, MMI and processing unit 24 is optionally, but not necessarily integrated with test equipment 16.

The signals which are analyzed by MMI and processing unit 24 optionally include, but are not limited to, the ring signal of tested telephone line 14, the waiting call tone of tested telephone line 14, a ringing signature, any voice announcement which may be automatically generated when tested telephone line 14 receives an incoming telephone call, and the impact of the ringing process on the DC/AC and electrical alterations signature of tested telephone line 14.

Figure 2:
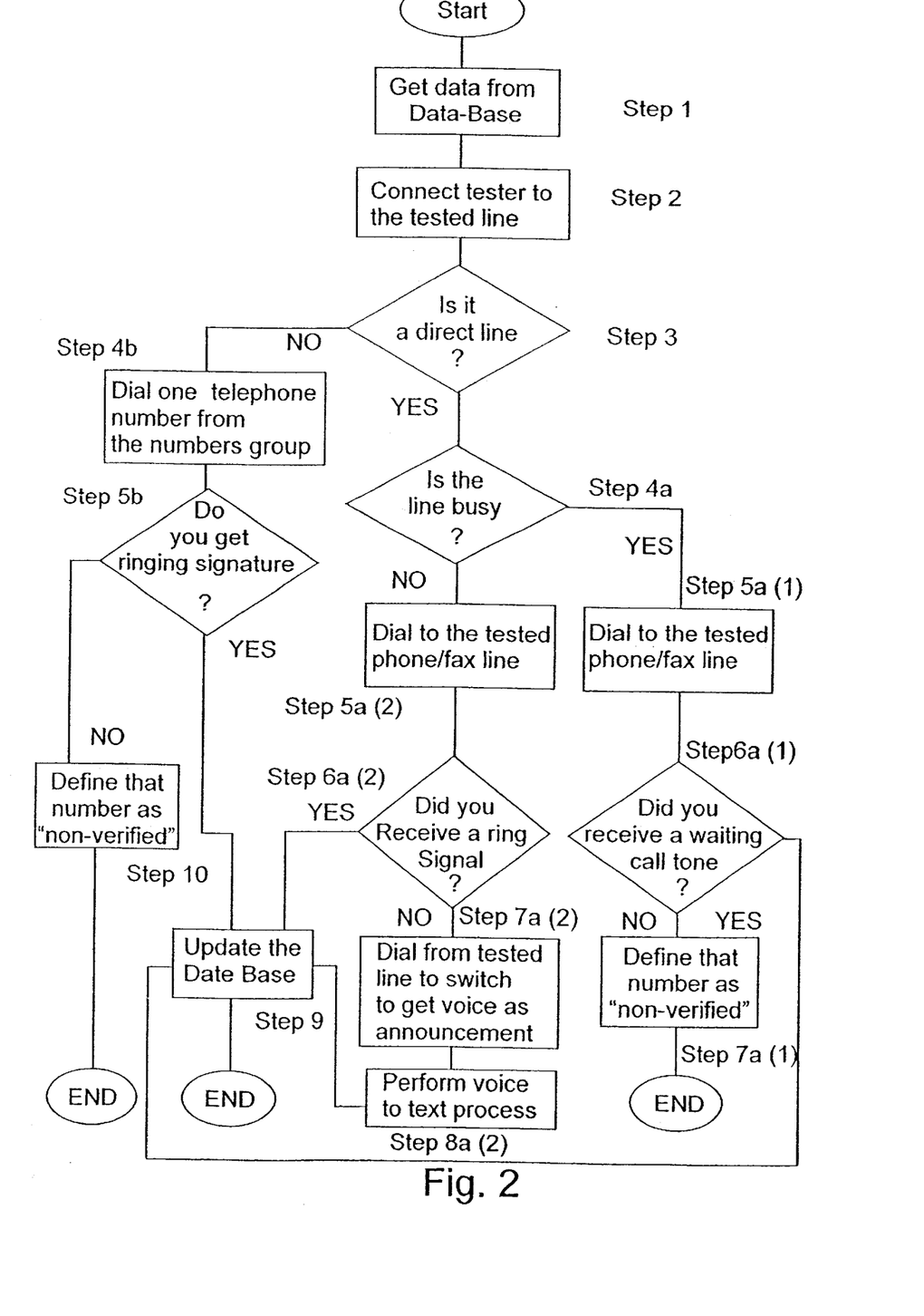
FIG. 2 is a flowchart of an exemplary method according to one aspect of the present invention.

In order to analyze such data, MMI and processing unit 24 performs the software instructions of the method of the present invention as described with regard to FIG. 2. FIG. 2 is a flowchart of the method of the present invention. At the start of the process, preferably substantially all telephone lines which are "live", or functioning for transmitting or receiving telephone calls, are identified (step not shown in FIG. 2). Such identification is optionally performed according to the voltage of the telephone line, although another type of electrical characteristic could be used for the identification. This permits the process of the present invention to be performed only on "live" telephone lines, which is more efficient since telephone lines which are not in service for transmitting telephone calls should not have assigned telephone numbers.

In step 1, any existing telephone number information is obtained from the database of such information. In step 2, the test equipment is connected to the telephone line to be tested. Such a connection could involve connecting the tap to the telephone line for example. In addition, as noted previously, the test equipment is also optionally and preferably connected to a dedicated auxiliary line for initiating a telephone call to the tested telephone line.

In step 3, the test equipment examines the telephone line to determine the type of telephone line, which is selected from the group consisting of direct and non-direct. Non-direct telephone lines include but are not limited to ISDN, ADSL or PCM lines.

If the telephone line is a direct line, then in step 4a, the test equipment determines whether the tested telephone line is busy. If the tested telephone line is busy, then in step 5a(1) a telephone call is initiated to the tested telephone line by dialing to the tested telephone line according to the expected telephone number which was obtained from the database in step 1. The telephone number is optionally dialed by the test equipment on the auxiliary dedicated line or alternatively by the telephone central office switch. Optionally, the tested telephone line could be dialed according to some other process.

Next, in step 6a(1), the test equipment determines whether a call waiting tone was received when the tested telephone line was dialed. If a call waiting tone was not received, then in step 7a(1) the telephone number is defined as non-verified, and this cycle of the process ends. Preferably, the tested telephone line is tested again if the telephone number is defined as unverified.

If, however, a call waiting tone was received, then the database is updated with the verification of the telephone number of the tested telephone line, in step 9. The call waiting tone is an example of a "ringing type signal" according to the present invention.

Returning now to the branch point of step 4a, if the test equipment alternatively determines that the tested telephone line is not busy, then in step 5a(2), a telephone call is initiated to the tested telephone line by dialing to the tested telephone line according to the expected telephone number which was obtained from the database in step 1. As for step 5a(1), the telephone number is optionally dialed by the test equipment on the auxiliary dedicated line or alternatively by the telephone central office switch, or else is optionally dialed according to some other process.

In step 6a(2), the test equipment determines whether a ring signal was received. The ring signal is another example of a "ringing type signal" according to the present invention. If such a ring signal was received, then in step 9, the database is updated as previously described. Alternatively, if such a ring signal was not received, then in step 7a(2), a telephone call is initiated from the tested telephone line to the telephone central office switch by dialing from the tested telephone line to a dedicated telephone number at the telephone central office switch. Preferably, this telephone call is initiated by the test equipment.

In step 8a(2), the voice announcement is received from the central office switch. Preferably, the voice announcement is converted to text in order to determine the contents of the message. More preferably, the dedicated telephone number at the central office switch which was called from the tested telephone line causes a voice announcement with the telephone number of the tested telephone line to be played. Thus, the telephone number of the tested telephone line is preferably determined from the voice announcement.

In order to obtain the information from the voice announcement, such as the telephone number of the tested telephone line, preferably the voice signals to text conversion was previously performed for substantially all such voice announcements by the central office switch, such that the received voice announcement must simply be compared to previously stored announcements in order to determine the contents of the entirety of the message or at least of a portion of the message. In this case, the telephone company itself could provide the text information for each voice announcement, for example. Alternatively, the voice announcement is converted to text "on the fly", according to voice conversion methods which are well known in the art.

After the contents of the message have been determined according to the converted text, these contents are then stored in the database to update the database for that tested telephone line in step 9. The contents of the message could also optionally include the telephone number of the telephone line itself, in which case the telephone number has been verified, and this information is also stored in the database.

Returning now to the branch point of step 4b, the test equipment has determined that the telephone line is a non-direct line, such that the telephone line is an ISDN, ADSL or PCM line for example, although the method described below would be operable for any type of non-direct line. The reason that a different method is required for the remainder of the steps for these two types of telephone lines is that ISDN, ADSL and PCM lines do not have a single user using a single telephone line, unlike the direct type of telephone line. An ISDN line has two channels for performing voice telephone calls and one channel for data transmission and reception. Thus, a single ISDN line has three channels.

PCM and ADSL lines are "mux" or multiplex lines, in which more than one user shares one telephone line. Typically, up to ten end users share a PCM telephone line, each with a different telephone number. Thus, PCM and ADSL telephone lines also do not fit the "one user, one line" model for direct lines, and a different telephone number identification and/or verification method is required.

In step 4b, one telephone number is dialed from the group of two or more of such numbers associated with the tested telephone line. As for the direct telephone line, the telephone number can either be dialed by the test equipment on the auxiliary line or by the telephone central office switch, or optionally according to some other process.

In step 5b, the test equipment determines whether a ringing signature was received. This ringing signature is another example of a "ringing type signal" according to the present invention. The ringing signature is optionally and preferably detected according to changes in the voltage, current, impedance, frequency spectrum (amplitudes in time intervals) or energy of the tested telephone line, or a combination thereof, such that there is a change in the behavior of the line. Such changes are characteristic of the ringing signature of the ring signal on the tested telephone line.

The "ringing type signal", as used herein, includes a message signal including characters and/or numbers, preferably a message signal that is displayed on a display.

If the ringing signature was received, then the telephone number is verified and that information is stored in the database in step 9.

Alternatively, if the ringing signature was not received, then in step 10, the telephone number is defined as non-verified, and the process ends.

For the non-direct telephone lines, the steps of the method, which are steps 4b, 5b and 9, or alternatively 4b, 5b and 10 (depending upon the result of step 5b) are preferably performed for each telephone number of the group of telephone numbers which is associated with the tested telephone line.

Figure 3:
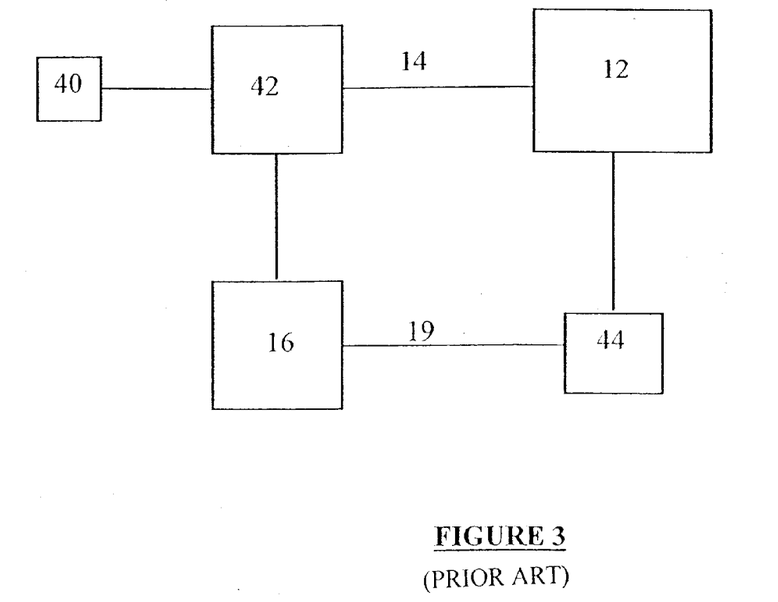
FIG. 3 is a simplified block diagram of the system for verification and/or identification of a telecommunication line dialing number according to the prior art.

FIG. 3 is a simplified block diagram of a system for the identification of a telephone line number according to the prior art.

A telephone 40 is connected to a tested telephone line 14 in an external telephone cabinet 42 or any such distribution frame. Test equipment 16 is connected to tested line 14, preferably in external telephone cabinet 42. A telephone call is initiated from test equipment 16, via tested line 14, to switch central 12 that identifies the calling telephone number by means of a Caller Identification (CID) unit 44 connected to switch central 12. CID unit 44 is implemented as a combination of hardware and software, and optionally is incorporated as a single physical unit within, or adjacent to switch central 12. After processing, the number of the telephone line that has been identified is transferred back to test equipment 16 through auxiliary dedicated telephone line 19.

It is cumbersome, expensive, and wasteful to wire an additional, service-dedicated telephone line from switch central, through the main distribution frame, including street cabinets, nearby deployed cabinets, etc., as needed, to each external telephone cabinet in the telephone network. Moreover, in the event that such a dedicated line was inadvertently not installed, or has ceased to function due to sundry reasons including vandalism, fire, accident, wear, etc., conventional test systems and methods are rendered inoperative. The identification of the service-dedicated telephone line and subsequent hook-up to the test equipment also require time and effort on the part of the telephone technician.

Figure 4:
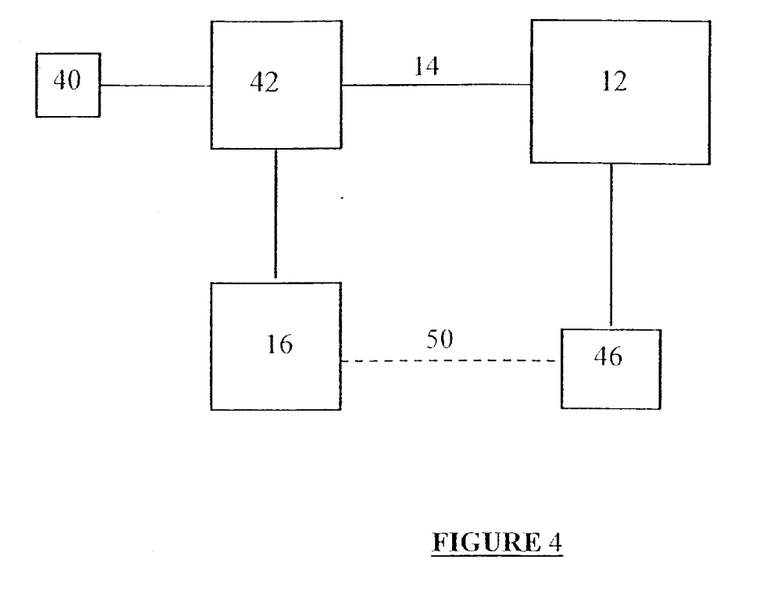
FIG. 4 is a simplified block diagram of the system for verification and/or identification of a telecommunication line dialing number utilizing test equipment having cellular capabilities, according to another aspect of the present invention.

FIG. 4 illustrates an inventive testing environment utilizing cellular capabilities. In sharp contrast to the prior art, CID unit 44 and auxiliary dedicated line 19 are not needed for the identification of a telephone line number.

In order to perform an identification of a line number that is connected in the external telephone cabinet 42 to telephone 40, test equipment 16 containing cellular capabilities is connected to tested line 14, preferably in external telephone cabinet 42. A telephone call is initiated from test equipment 16, via tested line 14, to switch central 12. Switch central 12 transfers the call to a cellular network 52 such as a cellular relay station, which transmits the call through cellular net-system 50 back to test equipment 16. Test equipment 16 then displays the identified number of tested line 14.

Obviously, the system is also capable of performing a line number verification. Verification is generally faster than identification and is of further advantage in that, unlike identification, verification can be performed even when the telephone line is busy, dialing or otherwise not free. For verification, the assigned number, which may be obtained from the customer, an appropriate telephone database 30, etc., is supplied to test equipment 16; a call is initiated from test equipment 16, via cellular net-system 50 to switch central 12. Line 14 is tested by test equipment 16 for receipt of a call. If test equipment 16 identifies a ringing signal or any other signal that can be identified as coming from the cellular number of test equipment 16, then the assigned telephone number has been verified.

The above-described identification and verification methods can be integrated into a single method having complementary identification and verification aspects. For example, if the verification aspect returns a negative response, the identification aspect is implemented. Alternatively, if the identification aspect is used initially, the verification aspect could be implemented in the event that the tested line is busy, etc.

The system and method according to one aspect of the present invention are directed towards testing the performance of one or more cellular communication channel services, or cellular communication channel and landline link services, at a particular location. Cellular systems are used today to communicate voice, picture and various kinds of data signals, and to supply internet services. These communications channels are often impaired by one or more defects such as data transmission errors, noise, clicks, delays, pitch distortion, cross-talk, cut-offs, echo sounds, etc., as well as additional parameters related to bandwidth and attenuation.

Figure 5A:
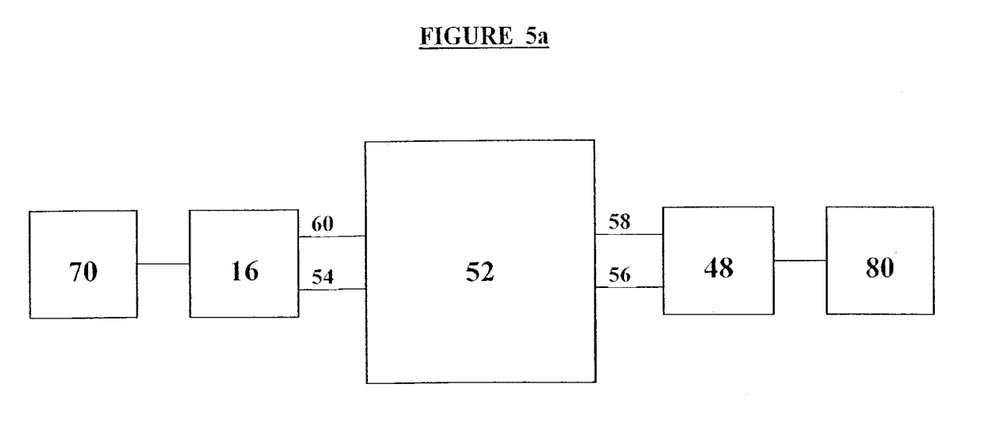
FIG. 5a is a simplified block diagram of a system for testing communication performance of a cellular channel utilizing two units of test equipment featuring cellular capabilities.

FIG. 5a is a simplified block diagram of a system for testing the communication performance of a cellular communication channel. In one preferred embodiment, a processor 70 connected to test equipment 16 initiates a message containing voice data and/or picture data and/or other data, from test equipment 16 via cellular route 54, a cellular network 52 and cellular route 56 to a cellular address 48. Processor 70 is preferably part of, or operatively connected to, a laptop computer, a palm computer or the like, and is separate from, or preferably attached to, test equipment 16 as a single physical unit. Cellular network 52 is a cellular relay station or a similar functional unit. Although cellular address 48 of FIG. 5a includes a cellular dialing number, the concept of a cellular address may be broadened to include information addresses, information storage centers, etc., as is described in more detail hereinbelow.

If cellular address 48 has a physical landline connection, the landline should preferably have known high-performance communication properties, such that the landline component does not contribute significantly and erroneously to the analysis of the performance of the cellular communication channel. Cellular address 48 is connected to processor 80, which is a server, PC computer, portable computer and the like. Processor 80 receives the message that has been initiated by processor 70, processes it and transmits back the processed message from cellular address 48, via cellular route 58, cellular network 52 and cellular route 60 to test equipment 16. Processor 80 may perform additional manipulations as needed.

Another possibility is to initiate the data message from cellular address 48 to test equipment 16, which then returns the data message to cellular address 48. Processor 80 compares the received and transmitted data message, and preferably processes the transmission performance according to pre-defined criteria of the user (e.g., bit error rate (BER), etc.).

Figure 5B:
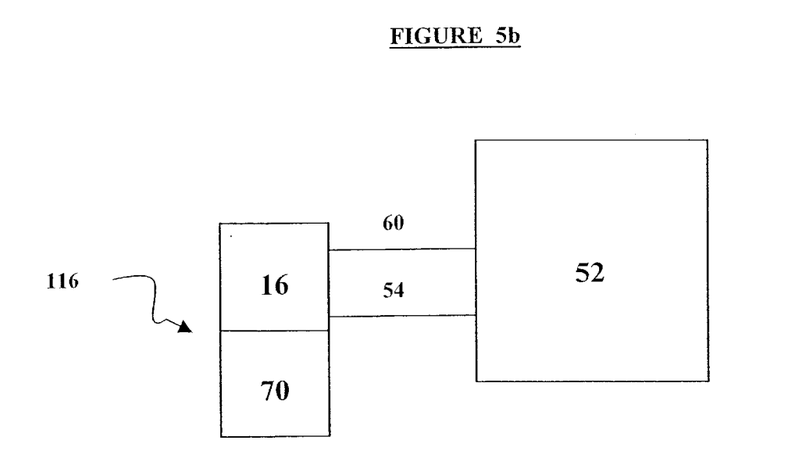
FIG. 5b is a simplified block diagram of a system for testing communication performance of a cellular channel utilizing multi-channel test equipment.

Optionally, cellular address 48 and test equipment 16 can be incorporated into multi-channel test equipment 116, which is preferably a single physical unit. A message, containing voice data and/or picture data and/or other data, is initiated by processor 70 from multi-channel test equipment 116, through cellular route 54 to cellular network 52. Cellular network 52 transmits the message back to multi-channel test equipment 116 via cellular route 60, for processing in processor 70. Processor 70 analyses the incoming message by comparing it to the sent message.

Additional integrated procedures can be performed with test equipment 16 connected to tested line 14 as shown in FIG. 4, thus testing the combination of a physical land line connected to a cellular network.

In cellular communication channels, transmitting performance from a first location to a second location is not necessarily identical to the transmitting performance from the second location to the first one, even at the same time. Also, receiving performance is not necessarily identical to transmitting performance. The system and method of the present invention is suitable for testing separately receiving and transmitting communications from first to second locations and vice versa, and to conduct comparison checking of the service of various cellular communication companies in a given location or region for finding the best possible service option.

It should be noted that the system and method for telephone number verification and identification provided in FIGS. 1 and 2 also apply to the technology described in FIGS. 5a and 5b, except that dedicated physical line 19 is replaced by a cellular communication channel.

It should be further noted that the technology provided in FIGS. 5a and 5b describes the invention by way of example, and is not intended to be limiting in any fashion. The above-described system and method can be used to test not only cellular channel performance, but also conventional telephone line performance, or combinations thereof. More generally, cellular address 48 can be defined as an information address, which includes information storing centers of various kinds. The information address may include processing capabilities, or be operatively connected to a unit having processing capabilities. Thus, the information address includes servers and data mailboxes, including voice mailboxes. Preferably, the information address is designed and configured to provide, upon demand, predefined signals or selected signals, such that specific communication performance parameters can be evaluated and stored by the test equipment.

Although the invention has been described in conjunction with specific embodiments thereof, it is evident that many alternatives, modifications, variations and combinations of the described features will be apparent to those skilled in the art. Accordingly, it is intended to embrace all such alternatives, modifications, variations and combinations of the described features that fall within the spirit and broad scope of the appended claims.

What is claimed is:

1. A method for identifying a telephone number associated with a tested telephone line, the method comprising the steps of:
   (a) operatively connecting a test equipment to the tested telephone line;
   (b) dialing via a communication port of said test equipment, via the tested telephone line, via a cellular communication system, to a cellular receiver;
   (c) processing a received signal received by said cellular receiver to identify the telephone number associated with the tested telephone line, and
   (d) displaying the telephone number associated with the tested telephone line on a digital readout of said test equipment.

2. A method of identifying a telephone number associated with a tested telephone line, the method comprising the steps of:
   (a) operatively connecting a test equipment to the tested telephone line;
   (b) dialing via a communication port of said test equipment, via the tested telephone line, via a cellular communication system, to a cellular receiver within said test equipment, and
   (c) processing a received signal received from said dialing to identify the telephone number associated with the tested telephone line.

3. A method of verifying a telephone number associated with a tested telephone line, the method comprising the steps of:
   (One) providing a test equipment having:
      (a) a monitoring unit for monitoring signals on the tested telephone line to obtain monitored signals;
      (b) a processing unit for processing said monitored signals;
      (c) an MMI unit, and
      (d) means for communicating to a cellular network;
   (b) operatively connecting said test equipment to the tested telephone line;
   (c) dialing from said test equipment via the tested telephone line, such that at least one signal is transmitted via said cellular network, via a central office switch, to the tested telephone line, and
   (Four) processing a received signal received from the tested telephone line, said received signal being associated with said at least one signal.

4. The method of claim 3, further comprising:
   (Five) if said received signal is a ringing type signal, verifying the telephone number.

5. The method of claim 3, further comprising:
   (e) if said received signal is not a ringing type signal:
      (i) dialing from said test equipment, via the tested telephone line, via said cellular network, to a cellular receiver, and
      (ii) processing a received signal received from said dialing of step (i) to identify the telephone number associated with the tested telephone line.

6. The method of claim 4, wherein said ringing type signal is a ringing signature, said signature selected from the group consisting of a change in an impedance of the tested telephone line, a change in a current of the tested telephone line, a change in a voltage of the tested telephone line, a change in frequency spectrum of the tested telephone line, and a change in energy of said received signal of the tested telephone line.

7. A system for identifying a telephone number associated with a tested telephone line comprising:
   (a) a test equipment having:
      (a) means for connecting to the tested telephone line;
      (ii) a dialing unit;
      (iii) a receiver for receiving a signal transmitted via the tested telephone line and via a cellular channel; and (b) a processor for processing said signal to identify the telephone number and additional data signals associated with the tested telephone line.

8. The system of claim 7, wherein said test equipment further includes:
   (iv) a digital readout for displaying said data signals associated with the tested telephone line.

9. The system of claim 7, wherein said test equipment further includes:
   (iv) a memory storage area for storing said data signals associated with the tested telephone line.

10. A system for verifying a telephone number associated with a tested telephone line, the system comprising:
    (a) a test equipment including:
       (i) means for connecting to the tested telephone line;
       (ii) means for transmitting a signal via a cellular network, to the tested telephone line;
       (iii) a monitoring unit for monitoring signals on the tested telephone line to obtain monitored signals;
       (iv) a processing unit designed and configured to process said monitored signals, such that the tested telephone number is verified.

11. The system of claim 10, further comprising:
    (b) an MMI unit operatively connected to said test equipment.

12. The system of claim 10, further comprising:
    (b) a memory storage unit for storing connected to said test equipment.

13. The system of claim 10, wherein said monitored signals include a ringing type signal.

14. The system of claim 10, wherein said ringing type signal has a ringing signature, said signature selected from the group consisting of a change in an impedance of the tested telephone line, a change in a current of the tested telephone line, a change in a voltage of the tested telephone line, a change in frequency spectrum of the tested telephone line, and a change in energy of said received signal of the tested telephone line.

* * * * *